United States Patent
Applegate

(10) Patent No.: US 6,323,576 B1
(45) Date of Patent: Nov. 27, 2001

(54) ELECTRIC POWER GENERATOR HAVING ROTOR MAGNETS AND STATOR FACES SIMILARLY SHAPED

(75) Inventor: Thomas F. Applegate, Placitas, NM (US)

(73) Assignee: Power Works, Inc., Placitas, NM (US)

( * ) Notice: Subject to any disclaimer, the term of this patent is extended or adjusted under 35 U.S.C. 154(b) by 0 days.

(21) Appl. No.: 09/679,050

(22) Filed: Oct. 4, 2000

Related U.S. Application Data

(60) Provisional application No. 60/158,357, filed on Oct. 12, 1999.

(51) Int. Cl.[7] .................................................. H02K 1/22
(52) U.S. Cl. .................. 310/268; 310/254; 310/156.38; 310/216
(58) Field of Search ..................... 310/254, 261, 310/156, 268, 216, 290, 155, 171, 152; 29/596–598; 290/43–44, 53–54

(56) References Cited

U.S. PATENT DOCUMENTS

| | | | |
|---|---|---|---|
| 3,700,942 | * 10/1972 | Alth ....................................... | 310/164 |
| 3,909,647 | 9/1975 | Peterson ............................... | 310/156 |
| 4,031,421 | 6/1977 | Geiger ................................... | 310/112 |
| 4,237,396 | 12/1980 | Blenkinsop et al. .................. | 310/154 |
| 4,360,860 | 11/1982 | Johnson et al. ....................... | 362/192 |
| 4,578,609 | 3/1986 | McCarty ................................ | 310/156 |
| 4,728,841 | 3/1988 | Sugden .................................. | 310/114 |
| 4,866,321 | 9/1989 | Blanchard et al. ................... | 310/112 |
| 4,879,484 | 11/1989 | Huss ....................................... | 310/114 |
| 4,882,513 | 11/1989 | Flygare et al. ......................... | 310/114 |
| 4,996,457 | 2/1991 | Hawsey et al. ....................... | 310/268 |
| 5,079,461 | 1/1992 | Schlüter et al. .................... | 310/67 A |
| 5,179,307 | 1/1993 | Porter .................................. | 310/68 B |
| 5,229,696 | 7/1993 | Golker et al. ......................... | 318/561 |
| 5,245,238 | 9/1993 | Lynch et al. .......................... | 310/116 |
| 5,696,419 | 12/1997 | Rakestraw et al. ................... | 310/268 |
| 5,717,266 | 2/1998 | Maynard, Jr. ......................... | 310/103 |
| 5,767,601 | 6/1998 | Uchiyama ............................. | 310/190 |
| 5,786,645 | 6/1998 | Obidniak ............................ | 310/68 R |
| 5,903,118 | * 5/1999 | Miekka et al. ....................... | 318/254 |
| 5,942,832 | 8/1999 | Oudet ................................... | 310/254 |
| 6,097,118 | * 8/2000 | Hull ......................................... | 310/74 |

* cited by examiner

Primary Examiner—Tran Nguyen
(74) Attorney, Agent, or Firm—Locke Liddell & Sapp LLP

(57) ABSTRACT

An electric power generator includes a stator including a plurality of stator members, each stator member includes a coil and top and bottom elements separated by a gap. The top and bottom elements each include a face. The generator further includes a rotor having a plurality of magnets. The rotary is rotatably mounted, such that the plurality of magnets pass within the gaps in the stator members when the rotor is rotated with respect to the stator. The magnets have a shape substantially equal to the shape of the stator member faces. Each of the magnets overlap the stator faces as the rotor rotates such that the area of overlap and non-overlap of each of the magnets changes non-linearly.

12 Claims, 4 Drawing Sheets

ELECTRIC POWER GENERATOR HAVING ROTOR MAGNETS AND STATOR FACES SIMILARLY SHAPED

RELATED APPLICATION

The present application claims priority to Provisional Application Ser. No. 60/158,357 filed Oct. 12, 1999 and entitled "Multiple Elements Discontinuous Generator".

TECHNICAL FIELD OF THE INVENTION

The present invention relates to electric power generating devices, and more particularly to an electric power generator having high efficiency which is light in weight, operates from a non-continuous or a continuous force, and may exhibit a negative input force requirement for brief periods during operation.

BACKGROUND OF THE INVENTION

A common method of powering hand-held flashlights or portable electrical devices is through the use of replaceable primary batteries, such as, for example, carbon-zinc, which are limited to a single discharge and typically have a limited shelf life. Some devices are provided with batteries of the type adapted to be recharged, such as nickel-cadmium batteries. Some electrical devices incorporate recharging units for the batteries, so that the unit may be plugged into a conventional wall outlet or other power source for recharging of the batteries. In other devices, auxiliary recharging devices are provided as separate units to enable recharging of the batteries in the device from various sources of power. While such arrangements have definite usefulness, it is apparent that their operating time in field use is limited to a single charge on the batteries and by self-discharge characteristics, and therefore these devices cannot be used for extended periods of time if separated from normal sources of power. In addition, unless constant care is taken on the part of the operator to maintain the charge on the batteries, such units may not be available at times of need or emergency.

Other portable electrical devices have incorporated various forms of manually operated generators to enable the operator to use the device without prior charging, such devices have the advantage that they are continuously available for use whether in emergency situations or in the event extended operation remote from conventional power sources is necessary. However, such devices have disadvantages, such as, for example, the constant operation becomes fatiguing, and the device ceases to function if the generator operation is stopped more than momentarily. Further, the hands of the generator operator may not be available for other manipulations. Many such devices have employed a variety of methodologies, such as, for example, fly wheels, to extend the operation of the generator to allow free use of hands or untended operation, and to level the output of the generator to avoid detrimental effects on the load.

A need has thus arisen for an electric power generator that will provide high current output at low input shaft forces to make even manual operation easy and practical.

SUMMARY OF THE INVENTION

In accordance with the present invention, an electric power generator is provided. The generator includes a stator including a plurality of stator members, each stator member including a coil and top and bottom elements separated by a gap. The top and bottom elements each include a face. The generator further includes a rotor having a plurality of magnets. The rotary is rotatably mounted, such that the plurality of magnets pass within the gaps in the stator members when the rotor is rotated with respect to the stator. The magnets have a shape substantially equal to the shape of the stator member faces. The shape is chosen to produce a non-linear rate of field change when the magnets and stator faces interact. Each of the magnets overlap the stator faces as the rotor rotates, such that the area of overlap and non-overlap of each of the magnets changes non-linearly.

The use of magnets and stator faces having a non-linearity in the change of the interacting area results in a greater induction, a higher EMF is induced, for the same relative velocity between the magnet and stator than there would be if one used square or rectangular magnets of the same total flux and stator faces which were of the same size and shape.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
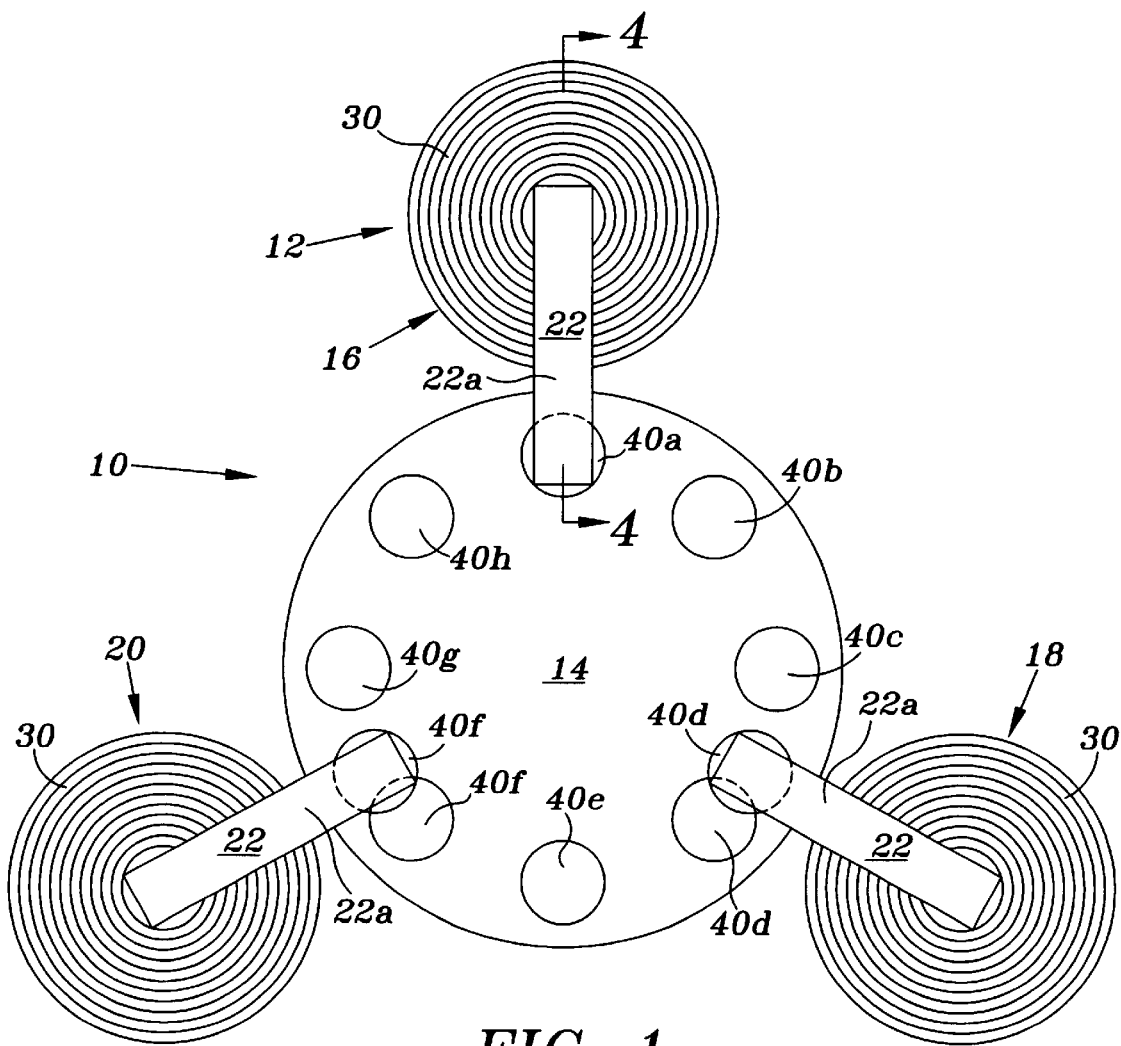
FIGS. 1–3 are diagrammatic illustrations of a top plan view of the present electric power generator in various rotor positions illustrating magnet and stator face overlap.
Figure 4:
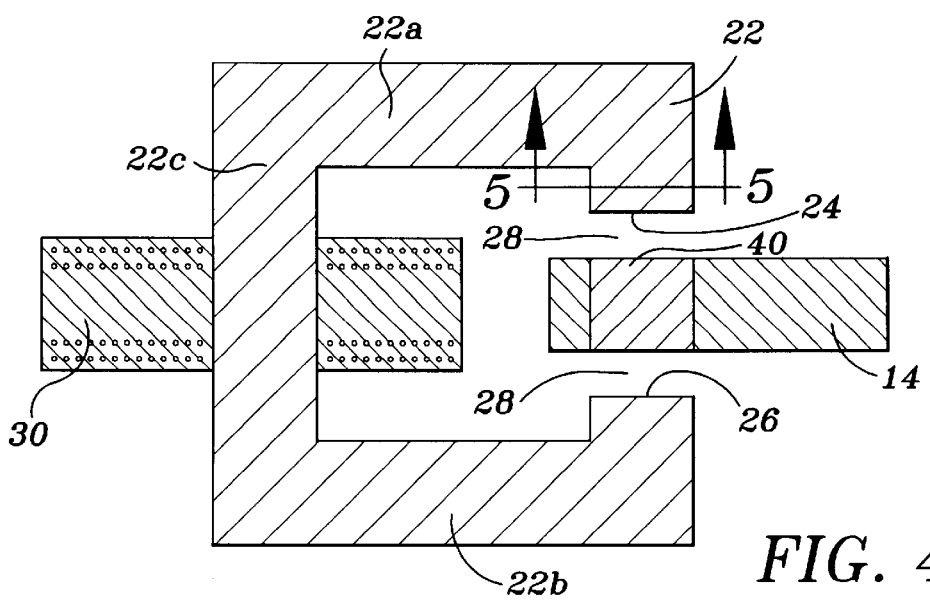
FIG. 4 is a cross-sectional view, taken generally along sectional lines 4—4 of FIG. 1.
Figure 5:
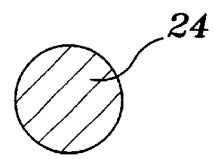
FIG. 5 is a cross-sectional view, taken generally along sectional lines 5—5 of FIG. 4.

Referring to FIGS. 1, 4, and 5, the present electric power generator is illustrated in diagrammatic form, and is generally identified by the numeral 10. Generator 10 includes a stator, generally identified by the numeral 12, which is generally stationary mounted on a base (not shown). A rotor on a shaft or a shaftless rotor 14 is rotatably mounted for rotation relative to stator 12.

Stator 12 includes a plurality of stator members, generally identified by the numerals 16, 18, and 20. Three stator members 16, 18, and 20 are shown in the Figures for illustrative purposes only, it being understood that as few as two stator members can be utilized with the present electric power generator 10. Each stator member 16, 18, and 20 includes a core 22 (FIG. 4) which is configured in a general "U" or "C" shape. Core 22 includes top and bottom leg or elements 22a and 22b, respectively. Top element 22a includes a face 24 (FIG. 5). Bottom element 22b includes a face 26 which has the same shape as face 24. Elements 22a and 22b are spaced apart by a gap 28. Rotor 14 rotates within gap 28 of each stator member 16, 18, and 20. Core 22 may be composed of laminated layers and is characterized by high magnetic permeability. Core 22 includes a winding 30 wound around leg or element 22c of core 22. Faces 24 and 26 may be integral to elements 22a and 22b or may be formed from a separate section of soft iron or other suitable material.

Rotor 14 is wheel-shaped and includes a plurality of circular-shaped permanent magnets 40, or magnet field sources, and specifically magnets 40a–40h. Eight magnets 40 are illustrated in the Figures; however, as few as two magnets may be utilized with the present electric power generator 10. Magnets 40 are fabricated from permanent magnetic material while rotor 14 is made of lightweight material characterized by low magnetic permeability. Magnets 40 are illustrated in the Figures as having a circular shape, it being understood that other shapes may be utilized that produce a non-linear characteristic.

Each magnet 40 has a north pole face and an opposed south pole face. The pole faces may be orientated in the same direction or alternately positioned around rotor 14. The radius of the circle defined by magnets 40 positioned on rotor 14 is established such that magnets 40 pass between successive gaps 28 in stator members 16, 18, and 20 when rotor 14 is rotated with respect to stator 12. As is appreciated by those skilled in the art, when rotor 14 is rotated to cause magnets 40 to pass through gaps 28, electricity is generated in winding 30.

Magnets 40 may be press-fit into receiving holes formed in rotor 14. Each magnet 40 extends through the entire width of rotor 14, as measured axially, as shown in FIG. 4, although magnets 40 may extend more or less than the width of rotor 14. The size, number, material, and properties of magnets 40 may vary depending on the waveform and magnitude of electrical output desired.

Rotor 14 may be rotatably mounted with respect to a base by any suitable structure, well known to those skilled in the art, and may include, for example, varying supports and rollers. The rotor 14 is driven by urging against rotor 14 or by connection of the shaft of rotor 14 to a prime mover by any suitable devices, well known to those skilled in the art, and may include, for example, various belts, pulleys and gears. As a consequence of the design of rotor 14, operability of the present generator 10 is possible at low rotor 14 rotational speeds and the drag experienced in turning rotor 14 may not appreciably increase with increasing rotations speeds. Furthermore, output voltage of generator 10 is relatively stable and generator 10 can effectively generate electricity at low rotational speeds.

An important aspect of the present invention is the configuration of faces 24 and 26 which are shaped to match the shape of magnets 40. In the preferred embodiment, the shape of faces 24 and 26 are circular to match the circular configuration of magnets 40. This configuration gives the advantage that as magnets 40 pass within gaps 28 and overlap stator faces 24 and 26 as rotor 14 rotates, the area of overlap of magnets 40 with respect to faces 24 and 26 changes non-linearly with respect to the change of linear insertion into gaps 28. As a result, an intrinsic non-linearity of magnetic field interaction is created between magnets 40 and stator members 16, 18, and 20 as the interaction proceeds from a minimum to a maximum or a maximum to a minimum. The application of the intrinsic non-linearity of magnetic field interaction yields the desired electrical and force characteristics of the present generator 10. The strength of the magnetic field extending to stator 12 changes proportional to this non-linearity, the overlap will change by 50% of the maximum area possible for a motion of less than 50% of the linear motion necessary to achieve complete overlap, it then appears that the velocity of the linear motion had increased for that portion, and in turn, the field velocity, rate of change of field strength, would be increased, thereby an intrinsic field velocity increase is obtained. The use of the present magnets 40 shaped similar to stator faces 24 and 26, the non-linear characteristic of the area of overlap, and the magnetic field through stator 12 reduces the effort needed to reduce the area of overlap by moving the magnets 40 or stator 12. This reduced effort and a non-linear change in magnetic attraction force achieves a self-sustaining motion for a finite period of time.

The generated voltage in generator 10 depends on how fast the magnetic field changes as it interacts with winding 30 of core 22. The rate of change of the magnetic field depends on the rate of change in the area overlapped by magnets 40 and faces 24 and 26 of core 22.

Figure 6:
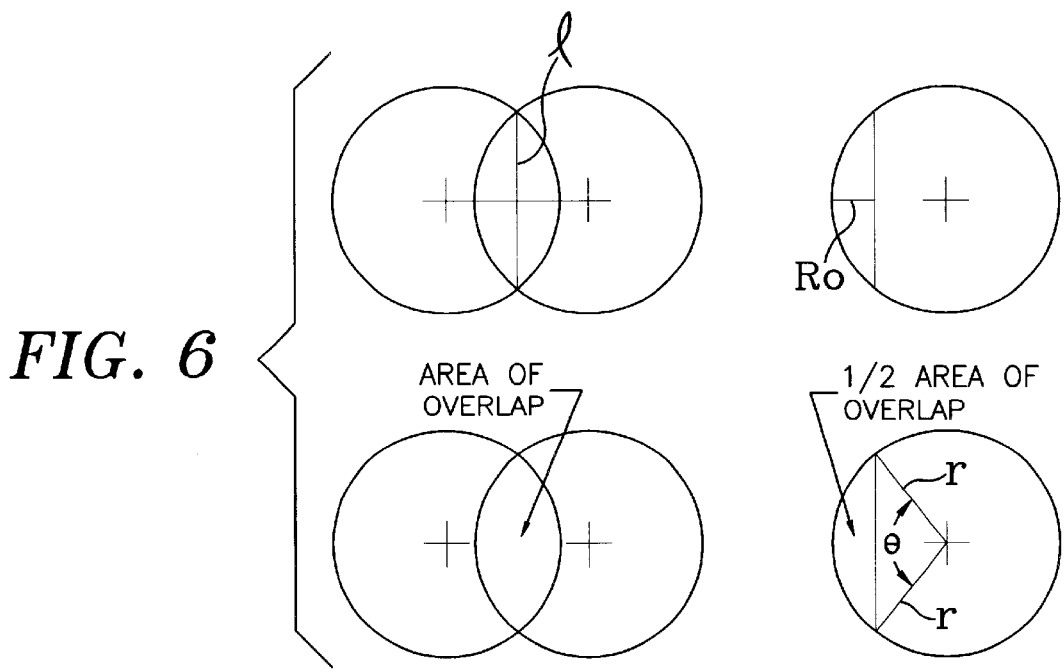
FIG. 6 is a diagram illustrating the area of overlap.
Figure 7:
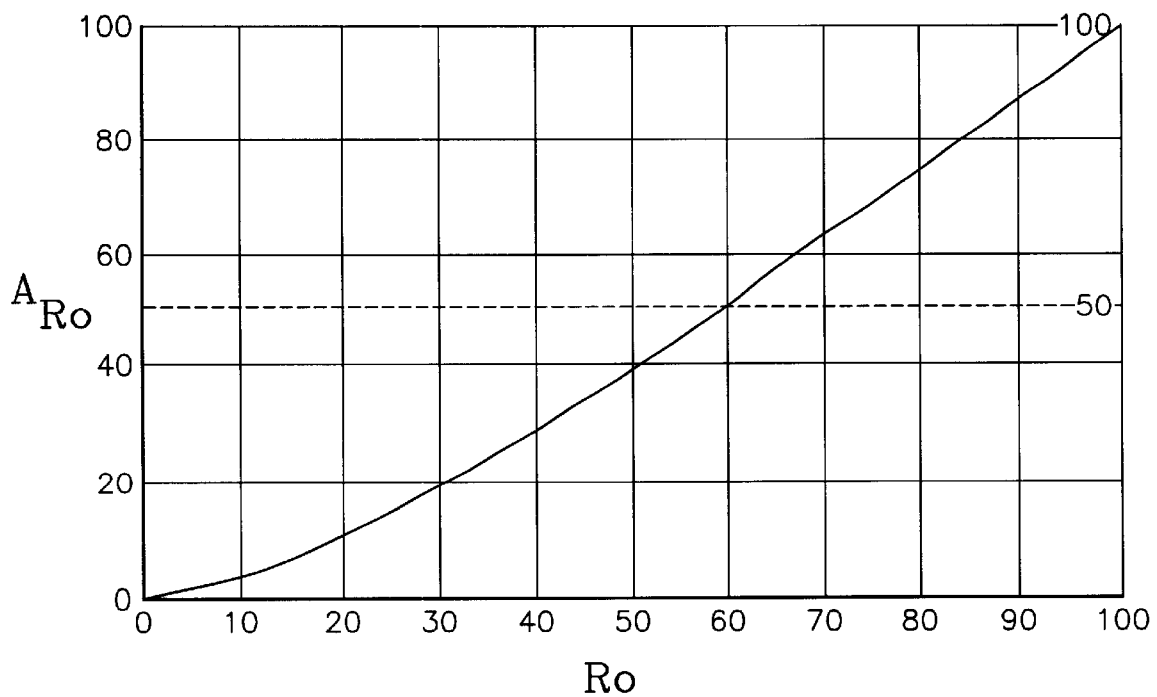
FIG. 7 is a graph of Ro versus the area of overlap.

Referring to FIGS. 6 and 7, if one draws two circles of equal diameter and overlapping, by some amount less than the diameter of the circle, the area of overlap has the shape of a lens with the point or ends of the lens being the points of intersection of the lines forming the two circles. A line, 1, connecting these two points splits the lens into two circular segments. This line is a chord which is common to the two circular segments. The area of each of these two circular segments is proportional to the square of the radius, r, of the circle of which it is a segment and the angle, 2, formed between lines connecting the center of the circle and the endpoints of the common chord. This means that as the centers of the circles are moved to increase or decrease the amount of overlap, or the distance between the centers, the area of the lens will change by an amount which is non-linear with respect to the distance change.

Once the circles in the example are in increasing or decreasing overlap the segment Ro will increase or decrease by ½ the change in the distance between the centers. If Ro is expressed as a percentage of the radius then the total depth of insertion in the gap is the same percentage of the diameter. The variable Ro is a decimal fraction of the radius. An Ro of 0.2 for an overlap involving circles with a radius of 0.5 means that the actual length of Ro is 0.1. As shown below the value of the segment Ro may be used to calculate the value 2 to use in the formula to determine ½ the area of overlap. The example below uses values for Ro of 0.01 r to r to produce the graph of FIG. 7.

At complete overlap Ro=r and the overlap area is the area of one circle. The radius, r, is 1 and the area $A_{Ro}$ is the area of overlap in percent of the area of one circle. FIG. 7 shows that the area of overlap, $A_{Ro}$, is 50% the area of the circle when the segment, Ro is 60% of the radius, r. Or when the distance between the centers is <=80% of the radius then the area overlapped is >=50%.

The graph of FIG. 7 is produced using the following:

Area of circular segment bounded by the chord $1=½.r^2.$
$$(2-\sin(2)) \tag{1}$$

For ½ circle and r=1 the area=

$$\frac{B \cdot r^2}{2} = 1.571 \tag{2}$$

$$Ro=1, 2 \ldots 100 \tag{3}$$

$$S_{Ro}=Ro.0.01\ r \tag{4}$$

$$ang_{Ro} = 2 \cdot acos\left(\frac{r - S_{Ro}}{R}\right) \tag{5}$$

$$ang_{Ro}=2 \tag{6}$$

$$A_{Ro} = \frac{\left[\frac{1}{2} \cdot r^2 \cdot (ang_{Ro} - \sin(ang_{Ro}))\right] \cdot 2}{\pi} \cdot 100 = \qquad (7)$$

total area of overlap for two circles

Figure 2:
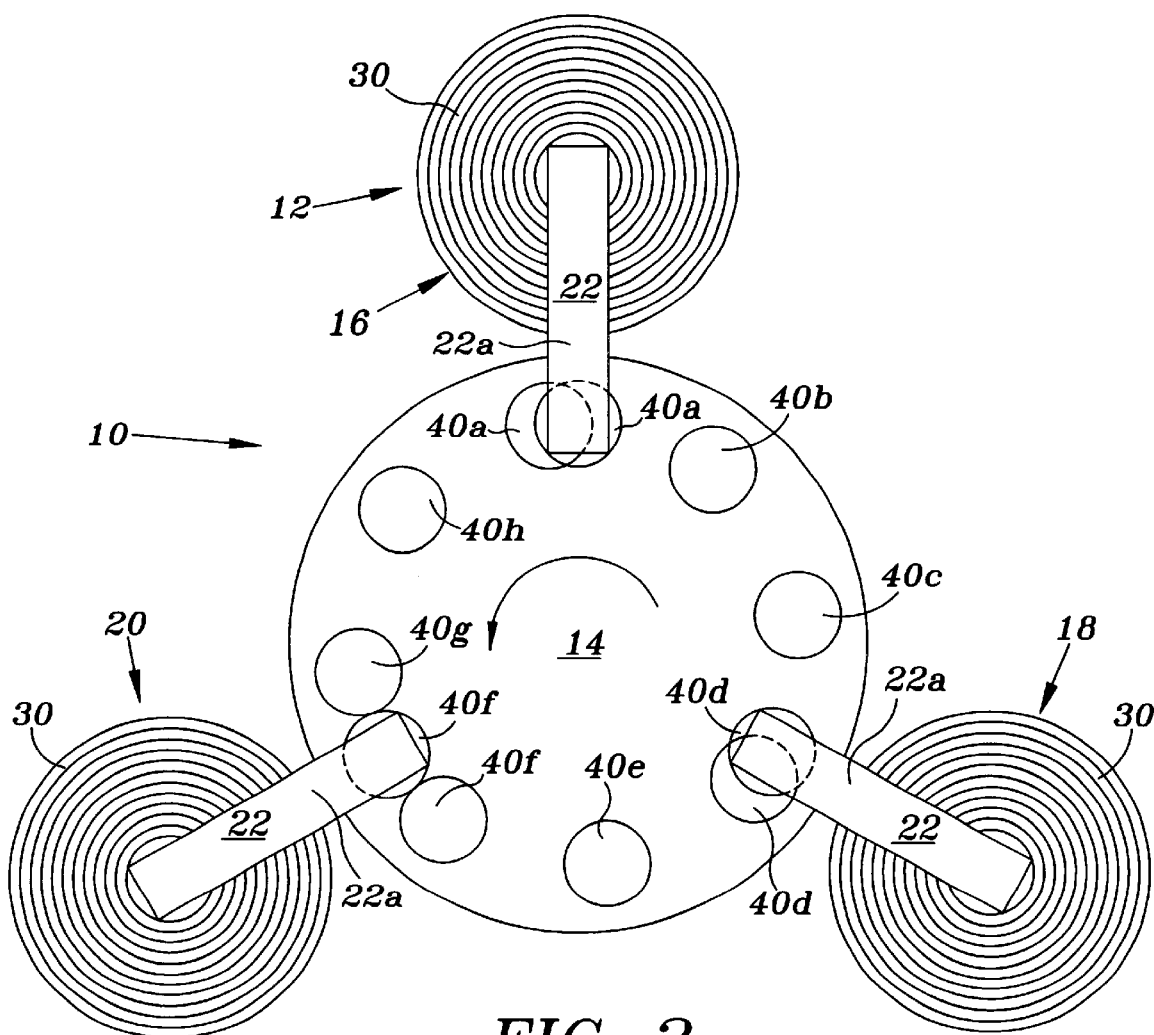
Figure 3:
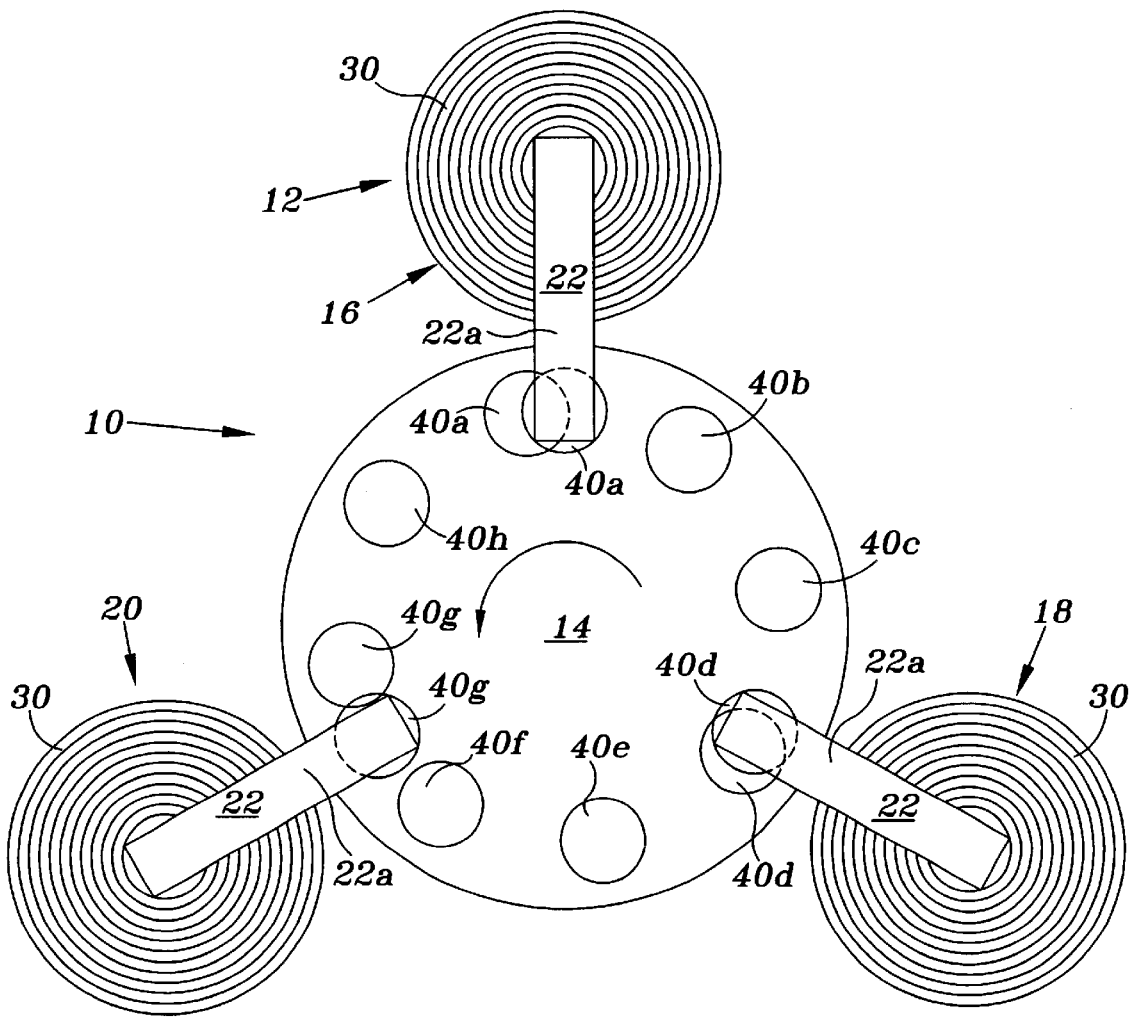

Referring simultaneously to FIGS. 1–3, stators 16, 18, and 20 are disposed about the circumference of rotor 14 at approximately 120° intervals with the centers of gaps 28 positioned so that magnets 40 may sequentially occupy gaps 28 as rotor 14 turns, thereby allowing each magnet 40 to have the same relationship during its transition through each gap 28. The diameter of magnets 40 and the space between magnets 40 in the configuration illustrated in FIGS. 1–3 is approximately 22.5°. This configuration dictates that, for any stator member 16, 18, or 20 having a magnet 40 centered in the respective gap 28, there will be a new magnet 40 in the same relative position to the stator member 16, 18, or 20 as the previous magnet 40 for each 45° rotation of rotor 14.

Referring to FIG. 1, if rotor 14 is oriented so that magnet 40a is centered in gap 28 of stator 16, then by defining a line from the center of rotor 14 and passing through a line connecting the center points of faces 24 and 26 of gap 28, zero degrees, the physical relationship of the other magnets 40 and stator members 18 and 20 can be identified. In this fashion, the next counterclockwise stator member 20, magnet 40f will be partially in gap 28 and extending outside of gap 28 in the counterclockwise direction. The center of magnet 40f is at approximately 135° and the center of gap 28 of stator member 20 is at approximately 120°. In this construction, 7.5° of magnet 40f is disposed within gap 28 of stator member 20. Continuing counterclockwise, the next stator member 18, magnet 40d is partially in gap 28 and extends outside of gap 28 in the clockwise direction with 7.5° of magnet 40d in gap 28 of stator member 18. Since magnets 40f and 40d both are disposed the same amount inside the respective gaps 28 of stators 20 and 18, respectively, with one in the clockwise and the other in the counterclockwise direction, the magnetic forces are balanced and rotor 14 is not pulled to rotate in either direction. With magnet 40a in gap 28 of stator member 16 there is no force pulling rotor 14 in either direction and without an external force to rotate rotor 14, rotor 14 as illustrated in FIG. 1 is stable. 7.5° of insertion is approximately 33.5% of the magnetic diameter of magnets 40, and therefore the amount of overlap between each of the magnets 40f and 40d and faces 24 and 26 of stator members 18 and 20 is approximately 22.1% of the area of magnet 40.

Referring now to FIG. 2, if rotor 14 rotates in the counterclockwise direction, there will be an increasing imbalance up to a point at which rotor 14 will experience sufficient magnetic forces in the counterclockwise direction to move for a time without additional external force. The first few degrees of motion will require little effort followed by a sharp increase in force required for a few more degrees of motion and then rotor 14 will accelerate in the direction of motion. This acceleration is due to the non-linear characteristic of the areas of the elements, magnets 40 and faces 24 and 26 and the force is proportional to those areas. When the Ro for an overlap is equal to 0.6 times the radius of magnet 40, the area of overlap is 50% of the area of magnet 40. The initial Ro for the overlap of magnet 40f is −0.335, 22.1% overlap of the area. The initial Ro for magnet 40d is 0.335, 22.1% overlap of the area. The initial Ro for magnet 40a is −1, 100% overlap of the area, in their respective gaps 28. For discussion purposes, an overlap and insertion that is resisting the counterclockwise motion will be given a negative value. A negative value does not mean one should use a negative value in the actual calculation of the area.

As rotor 14 rotates from the initial position shown in FIG. 1, magnets 40a and 40f are pulling in the clockwise direction resisting the motion and magnet 40d is pulling in the counterclockwise direction aiding the motion. At approximately 5° of rotation, Ro for magnet 40a is at −0.778 times the radius of magnet 40, Ro for magnet 40f is 0.116 times the radius of magnet 40, and Ro for magnet 40d is 0.556 times the radius of magnet 40 which results in the forces being unbalanced with a slightly negative, resisting force. As rotation continues for approximately another 2.5°, the Ro value for magnets 40a, 40f, and 40d will be changed by about 0.111 times the radius of magnet 40. At a total rotation of about 7.5° as illustrated in FIG. 2, magnet 40a with respect to stator member 16 will have an Ro of −0.667 times the radius of magnet 40. Magnets 40g and 40f will have an Ro of 0.006 and −0.006 times the radius of magnet 40, respectively, at stator member 20 and magnet 40d will have an Ro of 0.667 times the radius of magnet 40 at stator member 18 with the total force being essentially in balance.

Referring now to FIG. 3, at between 8° and 10° of rotation of rotor 14, the forces are large enough in the direction of motion such that rotor 14 is accelerating in the direction of motion and will continue until Ro is 1 for magnet 40d in gap 28 of stator member 18 or about another 5°. The net effect is that the new stable position results in magnet 40a at an Ro of −0.335 times the radius of magnet 40 at stator member 16, magnet 40g at an Ro of 0.335 times the radius of magnet 40 at stator member 20, and magnet 40d at an Ro of −1 at stator member 18, and approximately ⅓ of the motion necessary to move to the new stable position did not require any external force. The force required for the last ⅓ of the motion to the new stable position needs no additional extra action or the function of an active component and is intrinsic to the elements and their position. The next cycle would end with magnet 40g at an Ro of −1 times the radius of magnet 40 in stator member 20 and magnets 40d and 40b at an Ro of −0.335 and 0.335 times the radius of magnet 40 at stator members 18 and 16, respectively.

Force supplied during the last ⅓, or intrinsic, motion would accumulate to some degree as momentum, depending on the characteristics of the input source, and be released as force added to the currently applied external force upon rotor 14 moving to a new point of resistance. This force would be perceived as if rotor 14 became easier to turn and as if turning became easier as the rate of rotation of rotor 14 increased. Momentum is velocity dependent and the force resulting from momentum conversion is dependent on the time interval for the conversion. The resisting force, which would engender the conversion, arises suddenly as magnet 40d in the above example transitions through the point of full alignment in gap 28 of stator member 18. The improvements in the present electric power generator 10 result from the series of discrete magnets 40 sequentially brought into and out of position of interaction with stator members 16, 18, and 20 such that the non-linearity of the interactions due to the shape of magnets 40 and the corresponding faces 24 and 26 of stator members 16, 18, and 20 produce the described effects.

It therefore can be seen that the present electric power generator operates to achieve improved operating characteristics and that the more effort expended into operating the generator produces as usable electrical power when powered by appropriate input sources. Efficiencies are high enough to operate using a hand of an operator. The efficiency of the present generator is due in part to the ability to store what would otherwise be waste input force, and release this force during the part of the generator operating cycle giving force to aid in its continued operation. The present generator generally becomes easier to operate as the speed of operation and output increases. The present generator further is lightweight and much less susceptible to the various effects experienced by standard electric power generators during startup while connected to heavy loads, for example outputting into an electric storage cell.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. An electric power generator comprising:
    a stator including a plurality of stator members, each stator member including a coil and top and bottom elements separated by a gap, each of said top and bottom elements include a face having a shape;
    a rotor having a plurality of magnets, said rotor being rotatably mounted, such that said magnets pass within said gaps in said stator members when said rotor is rotated with respect to said stators, said magnets having a top surface and a bottom surface, wherein said top and bottom surfaces being shaped to substantially match said shape of said stator faces; and
    each of said magnets overlapping said stator faces as said rotor rotates a distance, such that an area of overlap and non-overlap of each of said magnets changes non-linearly as the distance between each of said magnets and said stator faces changes linearly to thereby produce a non-linear magnetic field interaction between said magnets and stator members.

2. The generator of claim 1 wherein said plurality of magnets are mounted in a circular pattern on said rotor and each of said plurality of magnets has a circular shape.

3. The generator of claim 1 wherein said stator members are generally C-shaped.

4. The generator of claim 1 wherein said plurality of stator members comprise three stator members equally spaced apart and circumferentially disposed around said rotor.

5. The generator of claim 4 wherein said plurality of magnets comprise eight magnets equally spaced apart on said rotor.

6. An electric power generator comprising:
    a stator including first, second, and third stator members, each stator member including a coil and top and bottom elements separated by a gap, each of said top and bottom elements includes a face having a shape;
    a circular rotor having a plurality of magnets circularly disposed in said rotor, said rotor being rotatably mounted, such that said magnets pass within said gaps in said stator members when said rotor is rotated with respect to said stators, said magnets having a top surface and a bottom surface, wherein said top and bottom surfaces being shaped to substantially match said shape of said stator faces;
    said stator members equally spaced apart and circumferentially disposed around said rotor, such that one of said plurality of magnets is disposed within one of said stator members each 45° rotation of said rotor; and
    each of said magnets overlapping said stator faces as said rotor rotates a distance, such that an area of overlap and non-overlap of each of said magnets changes non-linearly as the distance between each of said magnets and said stator faces changes linearly to thereby produce a non-linear magnetic field interaction between said magnets and stator members.

7. The generator of claim 6 wherein said plurality of magnets are mounted in a circular pattern on said rotor and each of said plurality of magnets has a circular shape.

8. The generator of claim 6 wherein said stator members are generally C-shaped.

9. The generator of claim 6 wherein said plurality of magnets comprise eight magnets equally spaced apart on said rotor.

10. An electric power generator comprising:
    a stator including first, second, and third stator members, each stator member including a coil and top and bottom elements separated by a gap, each of said top and bottom elements includes a face having a circular shape;
    a circular rotor having a plurality of magnets circularly disposed in said rotor, said rotor being rotatably mounted, such that said magnets pass within said gaps in said stator members when said rotor is rotated with respect to said stators, said magnets having a top surface and a bottom surface, wherein said top and bottom surfaces being configured with a circular shape to substantially match said circular shape of said stator faces; and
    each of said magnets overlapping said stator faces as said rotor rotates a distance, such that an area of overlap and non-overlap of each of said magnets changes non-linearly as the distance between each of said magnets and said stator faces changes linearly to thereby produce a non-linear magnetic field interaction between said magnets and stator members.

11. The generator of claim 10 wherein said stator members are generally C-shaped.

12. The generator of claim 10 wherein said plurality of magnets comprise eight magnets equally spaced apart on said rotor.

* * * * *